(No Model.)
E. B. MEATYARD.
CAR WHEEL.
No. 260,593. Patented July 4, 1882.
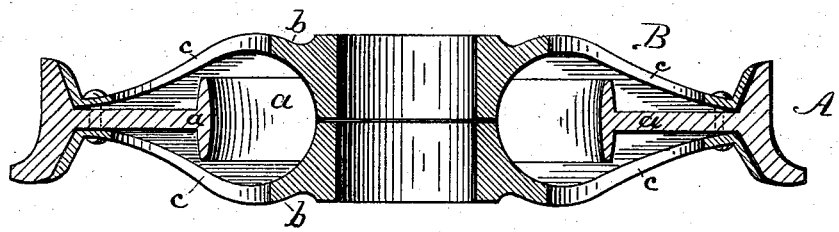
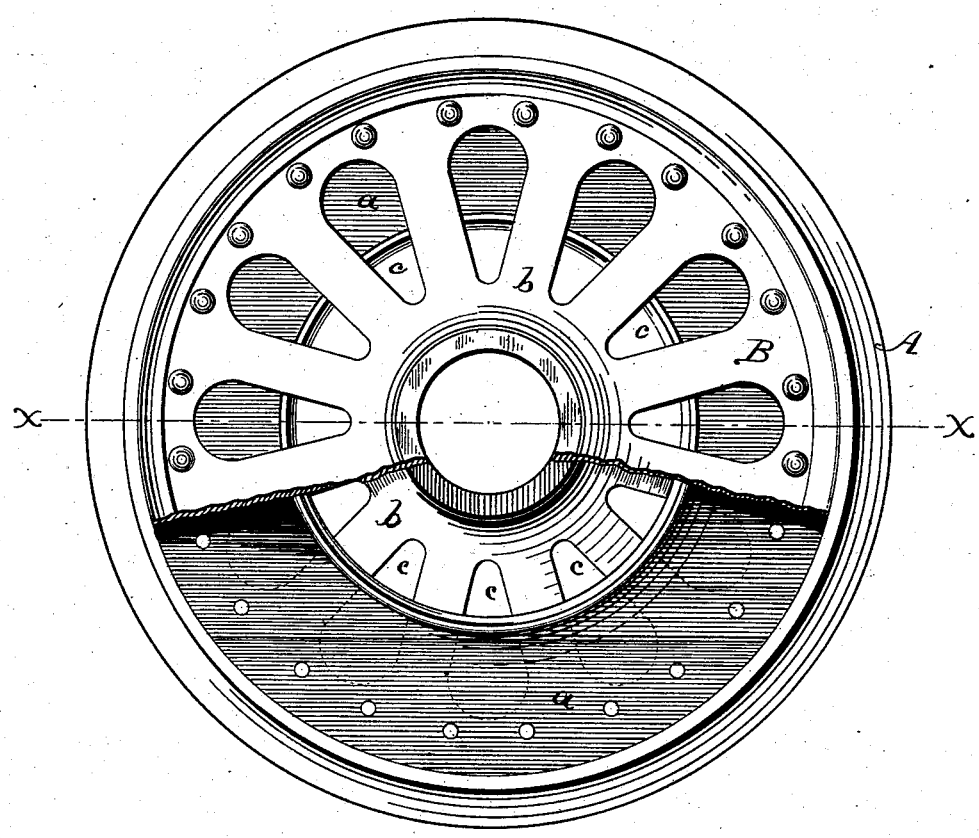
WITNESSES:
Thos. Houghton.
John C. Kemon
INVENTOR:
E. B. Meatyard
BY
ATTORNEYS.

UNITED STATES PATENT OFFICE.

EDWARD B. MEATYARD, OF GENEVA, WISCONSIN.

CAR-WHEEL.

SPECIFICATION forming part of Letters Patent No. 260,593, dated July 4, 1882.

Application filed April 22, 1882. (No model.)

To all whom it may concern:

Be it known that I, EDWARD B. MEATYARD, of Geneva, in the county of Walworth and State of Wisconsin, have invented certain new and useful Improvements in Car-Wheels, of which the following is a full, clear, and exact description.

The object of my invention is to utilize the elasticity in the body of car-wheels, so as to obtain a spring close to the sources of vertical and lateral shocks; also, to make such elasticity available without unduly exciting it in the manufacture of the wheel, and, further, to reduce the quantity of material by making it of better stock and in stronger form.

In my improved wheel the body is made in two parts that extend from the axle to the tire in curved form, and having radial slots, such parts being forced on the axle and riveted to an internal annular web on the tire, as hereinafter described and claimed.

Reference is to be had to the accompanying drawings, forming part of this specification, in which similar letters of reference indicate corresponding parts in all the figures.

Figure 1 is a side view of a wheel of the improved construction, and partially broken away. Fig. 2 is a cross-section of the same on line $x\ x$ of Fig. 1.

A is the tire, and B the body, composed of the two curved disks.

The tire A is formed with an internal annular web, $a$, which serves to strengthen the tire and also to receive the body. The tire is to be made as light as practicable, keeping in view the preservation of its circular form.

The body B is composed of two circular disks, $b\ b$, centrally apertured and enlarged around the aperture to form a hub, and from thence to their outer rims curved. They are also formed with radial slots $c$. The disks $b$, if made from rolled iron or steel, are hammered or forged so that the fibers shall be annular in the portions next to the axle and tire, and radial in the slotted portion, which yields, the slots being at least eight in number. By this construction the body or web of the wheel forms a cushion between the tire and axle, so that any sudden shock on the tire is instantly taken by the web, and the truck and car relieved.

The disks B are forced upon the axle and riveted to the internal annular web, $a$, of the tire, and the wheel thus constructed so that its natural elasticity may be availed of when required, but not excited by the process of manufacture. The disks are interchangeable, and are forged or cast to shape, so that lathe-work is not required to finish them, except in so far as is necessary to fit them to the axle.

The face or tread of the tire need not be coned, but as near cylindrical as practicable for half its width, and curved from thence to the flange under any suitable formula which will diminish the radii as the flange is approached.

Having thus fully described my invention, I claim as new and desire to secure by Letters Patent—

A car-wheel formed of a tire having the annular web $a$ and the two-part body B, the latter consisting of two centrally-apertured disks, $b\ b$, enlarged to form a hub, curved from thence to the outer rim, and having radial slots $c$, substantially as shown and described.

EDWARD B. MEATYARD.

Witnesses:
 JOHN B. SIMMONS,
 J. SIMMONS.